Oct. 1, 1968   A. W. KEHE   3,403,810
TAPE SEALED CONTAINER
Filed July 27, 1967
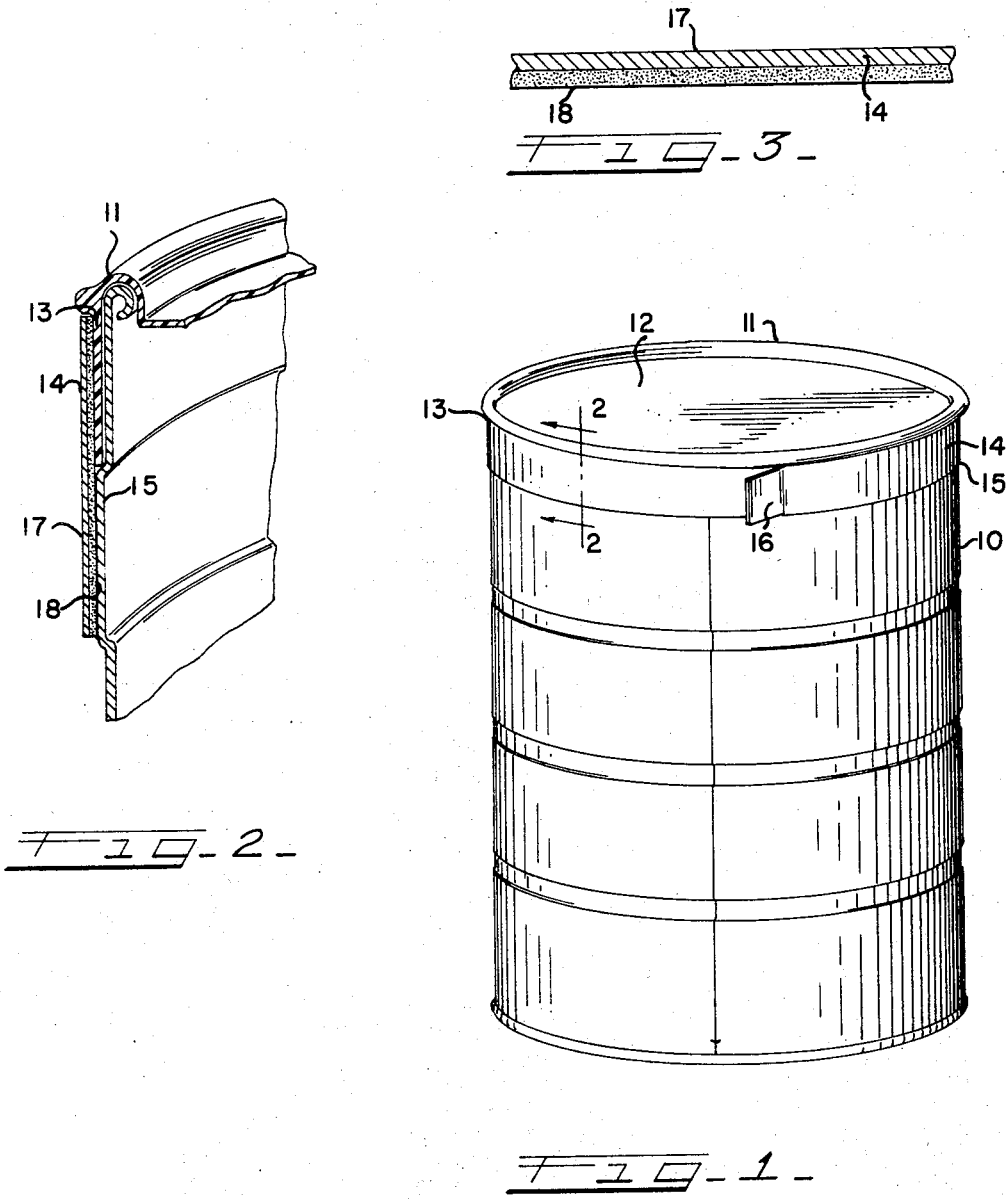
INVENTOR
ALFRED W. KEHE
BY Paul Shapiro
ATT'Y.

United States Patent Office 3,403,810
Patented Oct. 1, 1968

3,403,810
TAPE SEALED CONTAINER
Alfred W. Kehe, Berkeley, Ill., assignor to Continental Can Company, Inc., New York, N.Y., a corporation of New York
Filed July 27, 1967, Ser. No. 656,498
4 Claims. (Cl. 220—53)

ABSTRACT OF THE DISCLOSURE

A tape sealed container is constructed of a removable closure lid formed from a thermoplastic material composed of a blend of a major amount of polyethylene, and a minor amount of a copolymer of ethylene and a polar monomer, such as vinyl acetate, the lid being secured to the container by means of removable tape formed from a flexible stratified band having an adhesive composition applied to the inner surface thereof, the adhesive being composed of the same class of copolymers that are incorporated in the blend composition of which the lid is formed.

BACKGROUND OF THE INVENTION

Field of invention

This invention relates to containers and more particularly to a class of containers in which the closure lid is connected to the body of the container by means of a sealing tape having adhesive on one side to adhere the lid and body of the container respectively so that by tearing away the sealing strip, the lid may be readily removed from the body.

The prior art

In recent years, considerable importance has been attached to developing foodstuff containers that are increasingly attractive to the consumer by reason of their convenience. One of the most convenient points of these containers is easy opening. One such class of easy opening containers is comprised of a thermoplastic closure lid connected to the body of the container by means of a sealing strip having an adhesive on one side to adhere the lid to the body of the can respectively, so that by tearing away the sealing strip, the cover may be readily removed from the body.

In these containers, the container has a metal body of substantially conventional structure and is provided with a plastic lid generally composed of a polyolefin, such as polyethylene. The tear tape consists generally of a flexible backing material such as a polyester, metallized polyester, or a metal material such as aluminum affixed by means of a heat sealable adhesive or cement applied to the inner surface of the tape, such as ethylene/vinyl acetate copolymer, ethylene/ethyl acrylate copolymer, an ethylene/acrylic acid copolymer, ethylene/methacrylic acid copolymer or an ethylene/maleic acid copolymer.

One difficulty in providing a hermetically sealed container with lids formed of polyethylene, is that the polyethylene has a very low surface energy surface and as such, the adhesive has a very poor adherence to the polyethylene with the result that the tape is poorly adhered to the lid portion of the container.

The use of lids composed of polyethylene has been restricted for use in this field of packaging since conventional adhesives do not satisfactorily adhere to their surfaces. To be commercially practical and in order to obtain a satisfactory hermetic seal, it is essential that the adhesive tear tape adhere to polyethylene surfaces if these materials are to be utilized to their fullest extent.

SUMMARY OF THE INVENTION

In accordance with the present invention, there is provided a tape sealed container comprised of a container body, the container body being covered with a closure lid formed from a blend composition of polyethylene and and ethylene copolymer containing about 15 to about 40 percent by weight of a polar monomer based on the copolymer, the ethylene copolymer being present in the blend composition in an amount of about 10 to about 30 percent by weight of the polyethylene, the lid being secured to the can body to hermetically seal the container by a removable sealing tape constructed of a flexible band having an adhesive composition applied to the inner surface thereof, the adhesive being composed of the same ethylene copolymer class incorporated in the blend composition of which the lid is formed.

PREFERRED EMBODIMENTS

The blend compositions used to prepare the closure lids of the present invention are prepared by melting the polyethylene in a suitable container, agitating with a high shear and slowly adding the ethylene copolymer. The temperature of blending should be between about 230° and about 310° F. The time and temperature will be dependent upon the melt index of the polyethylene and the percentage of ethylene copolymer. Blending is continued until a homogenous mixture is obtained.

The blend compositions are suitable for injection molding of the closure lids. The closure lids used in the containers of the present invention may be of the type generally used in the container art, such as "slip-on," "friction-fit," "snap-on," and the like.

The term "polyethylene" as used herein includes low, medium and high density polyethylene; i.e., polyethylene having a density in the range of 0.91 to 97.

Illustrative polar monomers of which the ethylene copolymer may be composed include ethylenically unsaturated esters, such as alkyl acrylates, such as methyl acrylate, ethyl acrylate, butyl acrylate; $\alpha,\beta$-ethylenically unsaturated acids, such as acrylic acid, methacrylic acid and maleic acid; vinyl acetate, acrylonitrile, arylamide and the like. These ethylene copolymers may be combined with the polyethylene in any suitable manner and may be blended therewith while the polyethylene material is being processed for formation into the container lid by molding procedures, such as injection molding.

Dependent upon the ultimate properties desired in the end product, the polyethylene blend composition of the lid may be further modified by addition of materials, such as anti-static agents, anti-oxidants, pigments, fillers, and the like. Other resins in minor amounts may also be incorporated into the polyethylene blend composition in ways obvious to those skilled in the art.

The amount of the ethylene copolymer that is blended with the polyethylene in preparing the closure lids to which the sealing tape will hermetically seal may vary from 10 to 30 percent based on the weight of the polyethylene. Preferably, the amount of copolymer incorporated in the polyethylene will vary from 10 to 20 percent based on the weight of the polyethylene.

Ethylene copolymers which are incorporated in the polyethylene blend of which the closure lid is to be formed are, preferably, ethylene/vinyl acetate, ethylene/ethylacrylate, ethylene/acrylic acid, ethylene/methacrylic acid, ethylene/maleic acid copolymers having a melt index in the range of from 2 to 355 and having polar monomer concentrations ranging from 15% to 40%, based on the weight of the copolymer. The activation temperatures of the copolymers employed as the tape adhesive should be preferably lower than the softening temperature of the polyethylene blend of which the lid is composed so that the heat distortion and shrinkage of the container parts are minimized. Generally, ethylene copolymers having heat softening ranges from 180° to 300° F. have been found desirable.

In the drawing:

FIGURE 1 is a top perspective view of a container constructed in accordane with the present invention and illustrates a closure lid secured to an upper end portion of the container by a removable sealing tape which hermetically seals the container.

FIGURE 2 is an enlarged fragmentary vertical sectional view taken along the line 2—2 of FIGURE 1 and shows generally the connection between the container body and the closure therefor.

FIGURE 3 is a cross-sectional view of a portion of the sealing tape.

The container illustrated in the drawing is comprised of the container body 10 which is preferably formed of metal although it may be formed of other materials, and closure lid 11, the lid being constructed of a thermoplastic blend material comprised of about 70 to about 90 percent by weight of polyethylene admixed with about 10 to about 30 percent by weight of a copolymer of ethylene and a polar monomer such as vinyl acetate, ethyl acrylate, acrylic, methacrylic or maleic acid.

The closure lid 11 is formed primarily of an end wall 12 and a depending peripheral skirt 13. The lid 11 is dimensioned to snugly fit into the extreme upper end portion of the container body. The connection between the closure lid 11 and the container body 10 is sealed by means of tape 14 which is applied to the exterior of the container 10. The tape 14 is formed of a suitable gas impervious material and is wrapped around the upper portion of the container body with the tape 14 having the upper portion thereof bonded to the skirt 13 and the lower portion thereof bonded to the container body intermediate portion 15, the tape 14 bridging the line of juncture between the closure lid 11 and the container body 10.

An end portion of the tape 14 which is not adhered on the container body 10 is doubled back on itself to form a pull tab 16.

The tape 14 is a flexible or semi-flexible stratified band in which external layer 17 is formed from a metal foil, low gas permeable plastic films, or metallized low gas permeable plastic films, e.g., aluminum, Mylar (polyethylene terephthalate), metallized polyethylene terephthalate, having a thickness ranging from 0.002 to 0.004 inch on which is coated a layer 18 ranging in thickness from 0.001 to 0.003 inch of a heat sealable thermoplastic ethylene copolymer selected from the same class of copolymers that are incorporated in the blend composition of the lid 11.

The ethylene copolymer layer is extruded in a molten state or from a solvent solution onto the backing layer 17. The most practical way of accomplishing this is to apply the copolymer resin onto a large web of the backing sheet 17 and to then cut the tape 14 from the resultant laminated structure.

The tape 14 may be heat sealed to the container body 10 and skirt 13 to create a hermetic fluid-proof seal around the line of juncture between the body and lid in any desired manner using conventional tape sealing machines.

The tape may be easily applied by heating the container body to the desired heat seal temperature, e.g., 225° to 350° F., and pressing the tape against the upper end of the closed container body under moderate pressure as the body is rotated.

When it is desired to open the container 10, the tape 14 is torn therefrom by gripping the container in one hand and pulling the tape axially off the container by gripping the tab 16 of the tape 14. It is immediately obvious that the container 10 can be resealed by merely repositioning the closure lid 11 on the container body. To obtain an adequate hermetic seal, it has been found that the force required to remove the tape, commonly referred to as "peel," should be in the range of about 3 to 4 pounds based on a continuous force required to remove a ½ inch wide strip of tape from the surface to which it has been adhered, at an angle of 180° at a speed of 1 inch per minute at 77° F. Peel values less than 2 pounds are not likely to provide a suitable seal, particularly under conditions of shipping. Peel values of about 5 lbs. per ½ lineal inch are objectionable because of the increased force required for removal, undesirable transfer from the backing film to the container, and possible tape fracture.

To illustrate the manner in which the invention may be carried out, the following example is given. It is to be understood, however, that the example is for the purpose of illustration, and the invention is not to be regarded as limited to any of the specific materials or conditions recited therein.

EXAMPLE

One hundred parts of a polyethylene having a density of 0.95 and a melt index of 5 was homogenously admixed at 310° F. with 12 parts of an ethylene/vinyl acetate copolymer containing 33 percent by weight vinyl acetate having a density of 0.957 and a melt index of 25.

The polymer blend was then injection molded into a slip-on lid of the type illustrated in FIG. 1 of the drawing. The lid was then sealed to a tinplate can body by an adhesive tear tape constructed of a ½ inch wide piece of a metallized polyethylene terephthalate film having a thickness of 0.003 inch to the inner surface of which had been extrusion coated a 0.003 inch coating of the ethylene/vinyl acetate copolymer which copolymer was of the same class used to prepare the polymer blend from which the lid was formed.

The tape with a colored pull tab at one end was stretched around the circumferential joint formed between the can body and the lid, the can having been preheated to 300° F.

The peel strength of the tape was found to be 3 pounds per ½ lineal inch.

By way of contrast, the force required to pull the same tape from a similar can having a lid formed from a blend of 100 parts of the polyethylene used in the above example and 7 parts of the ethylene/vinyl acetate used in the above example was 1.5 pounds per ½ lineal inch.

By way of further contrast, the force required to pull the same tape from a similar can having a lid formed from the polyethylene used in the above example was 0.5 pound per ½ lineal inch.

What is claimed is:

1. A tape sealed container comprising a container body closed at the bottom end and having an open upper end, a removable closure lid having a skirt portion fixed to and closing the upper end of the body, said lid being composed of a thermoplastic material comprised of a blend composition of polyethylene and an ethylene copolymer containing about 15 to about 40 percent by weight of a polar monomer based on the copolymer, said ethylene copolymer being present in the blend composition in the amount of about 10 to about 30 percent by weight of the polyethylene; a manually removable sealing tape constructed of a flexible band having an adhesive composition applied to the inner surface thereof, said tape extending about the exterior of the container and bridging a line of juncture between the body and the lid with the tape being bonded to the closure skirt portion and a portion of the body which the skirt abuts for securing the lid to the body to hermetically seal the container, the adhesive being composed of the same class of ethylene copolymer that is incorporated in the blend composition of which the lid is formed.

2. The container of claim 1 wherein the ethylene copolymer is present in the blend composition in an amount of about 10 to about 20 percent by weight of the polyethylene.

3. The container of claim 1 wherein the polar monomer is vinyl acetate.

4. The container of claim 1 wherein the flexible band is formed from a polyester type film.

References Cited

UNITED STATES PATENTS 3,235,069  2/1966  Bennett et al. _____ 220—53 X
3,334,776  8/1967  Ellis _____ 220—53

THERON E. CONDON, *Primary Examiner.*

G. T. HALL, *Assistant Examiner.*